United States Patent [19]

Vassalotti et al.

[11] Patent Number: 4,470,946
[45] Date of Patent: Sep. 11, 1984

[54] REMOVABLE PIPELINE PLUG

[75] Inventors: Michael Vassalotti, New Milford, Conn.; Frank Anastasi, Cold Spring, N.Y.

[73] Assignee: Automation Industries, Inc., Greenwich, Conn.

[21] Appl. No.: 412,871

[22] Filed: Aug. 30, 1982

[51] Int. Cl.³ .............................................. F16L 55/12
[52] U.S. Cl. ...................................... 376/204; 138/90; 376/250
[58] Field of Search ...................... 73/49.1; 138/89, 90, 138/91, 92, 93, 103, 109; 166/212; 220/232, 323, 217, 218, 222, 224; 376/204, 250

[56] References Cited

U.S. PATENT DOCUMENTS

| 1,735,461 | 11/1929 | Haupt | 220/224 |
|---|---|---|---|
| 3,593,749 | 7/1971 | Reardon | 138/93 |
| 3,844,313 | 10/1974 | Arnold | 138/90 |
| 3,942,560 | 3/1976 | Deaver | 138/89 |
| 3,946,761 | 3/1976 | Thompson et al. | 138/93 X |
| 3,978,892 | 9/1976 | Scodino | 138/90 X |
| 4,071,164 | 1/1978 | Skakunov | 220/224 |
| 4,102,474 | 7/1978 | Platts | 220/323 |
| 4,133,386 | 1/1979 | Knox | 166/212 X |
| 4,258,787 | 3/1981 | Amancharia | 166/212 X |
| 4,371,090 | 2/1983 | Ogarek et al. | 220/224 |

Primary Examiner—Stephen Marcus
Assistant Examiner—Mark Thronson
Attorney, Agent, or Firm—Francis N. Carten

[57] ABSTRACT

A removable plugging device for a pipeline, and particularly for pressure testing a steam pipeline in a boiling water reactor, wherein an inflatable annular sealing member seals off the pipeline and characterized by radially movable shoes for holding the plug in place, each shoe being pivotally mounted for self-adjusting engagement with even an out-of-round pipeline interior.

1 Claim, 9 Drawing Figures

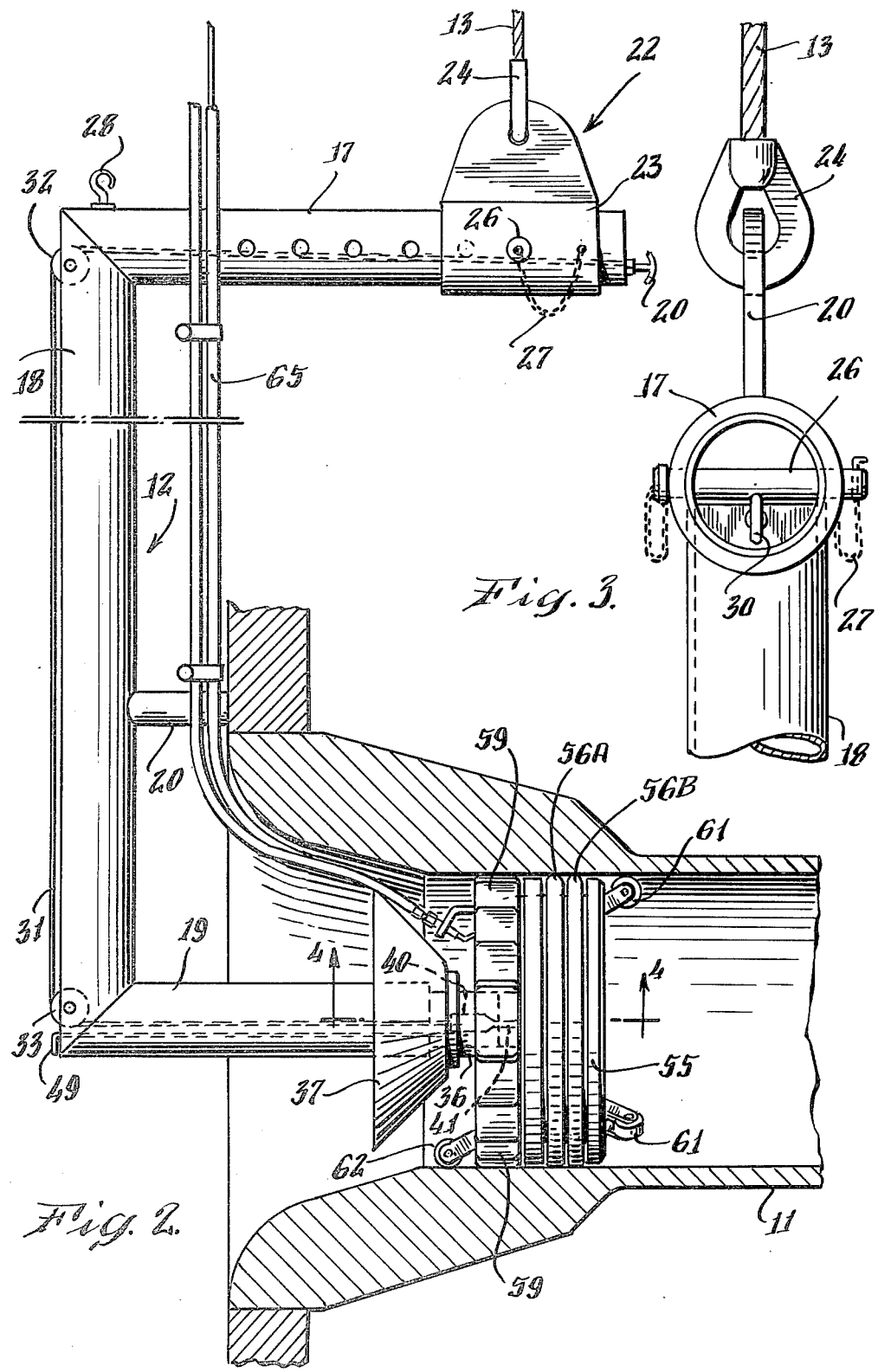

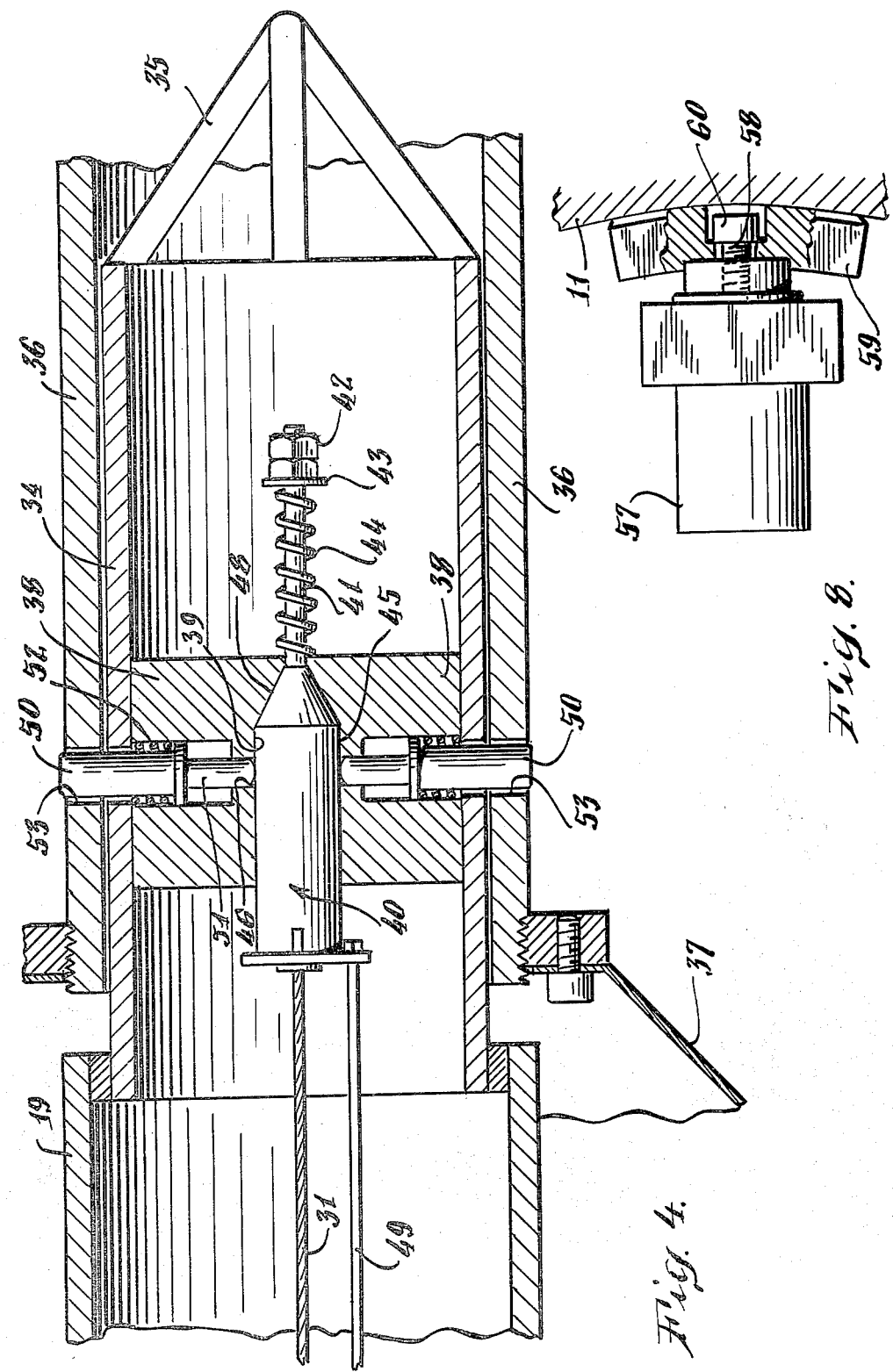

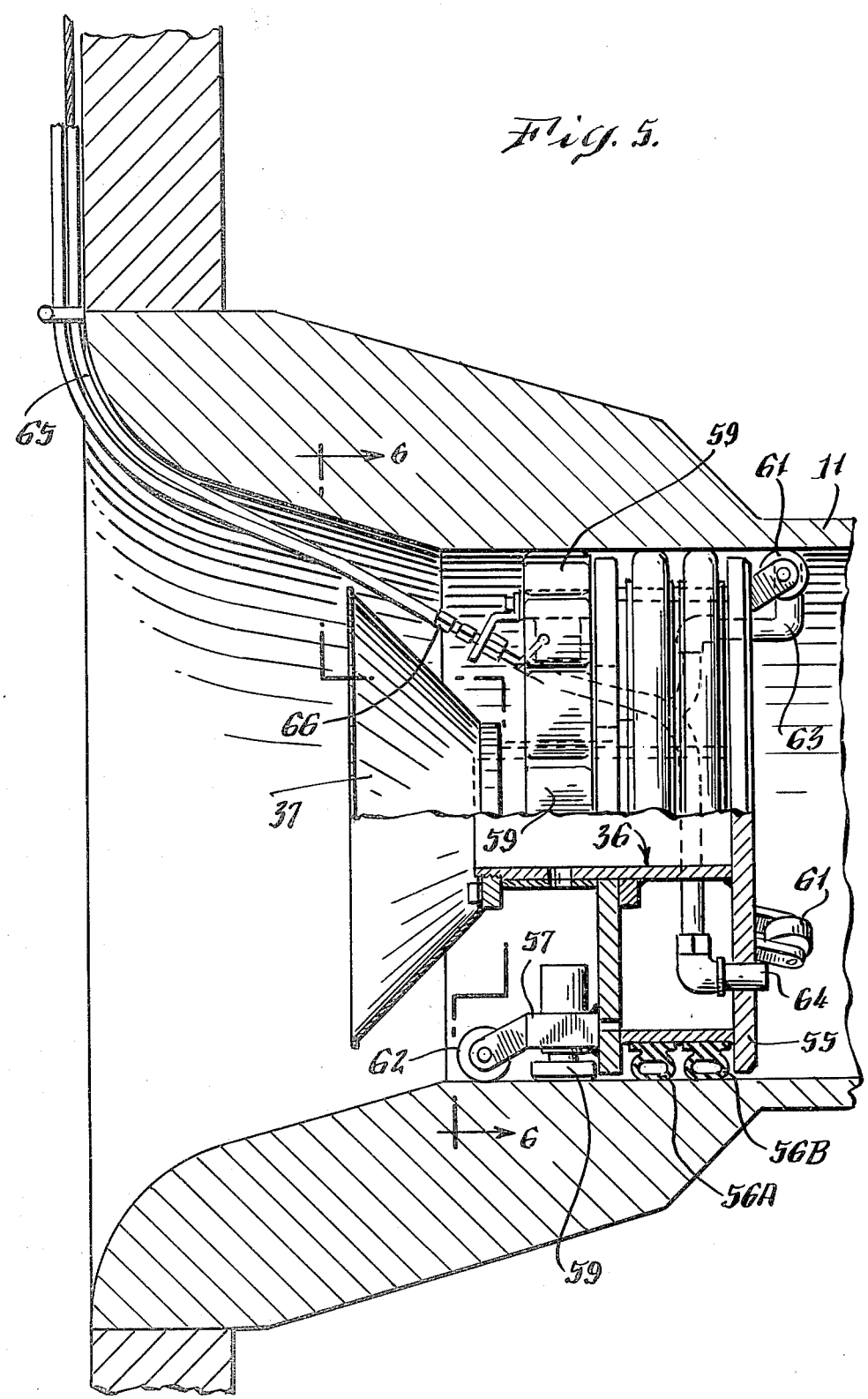

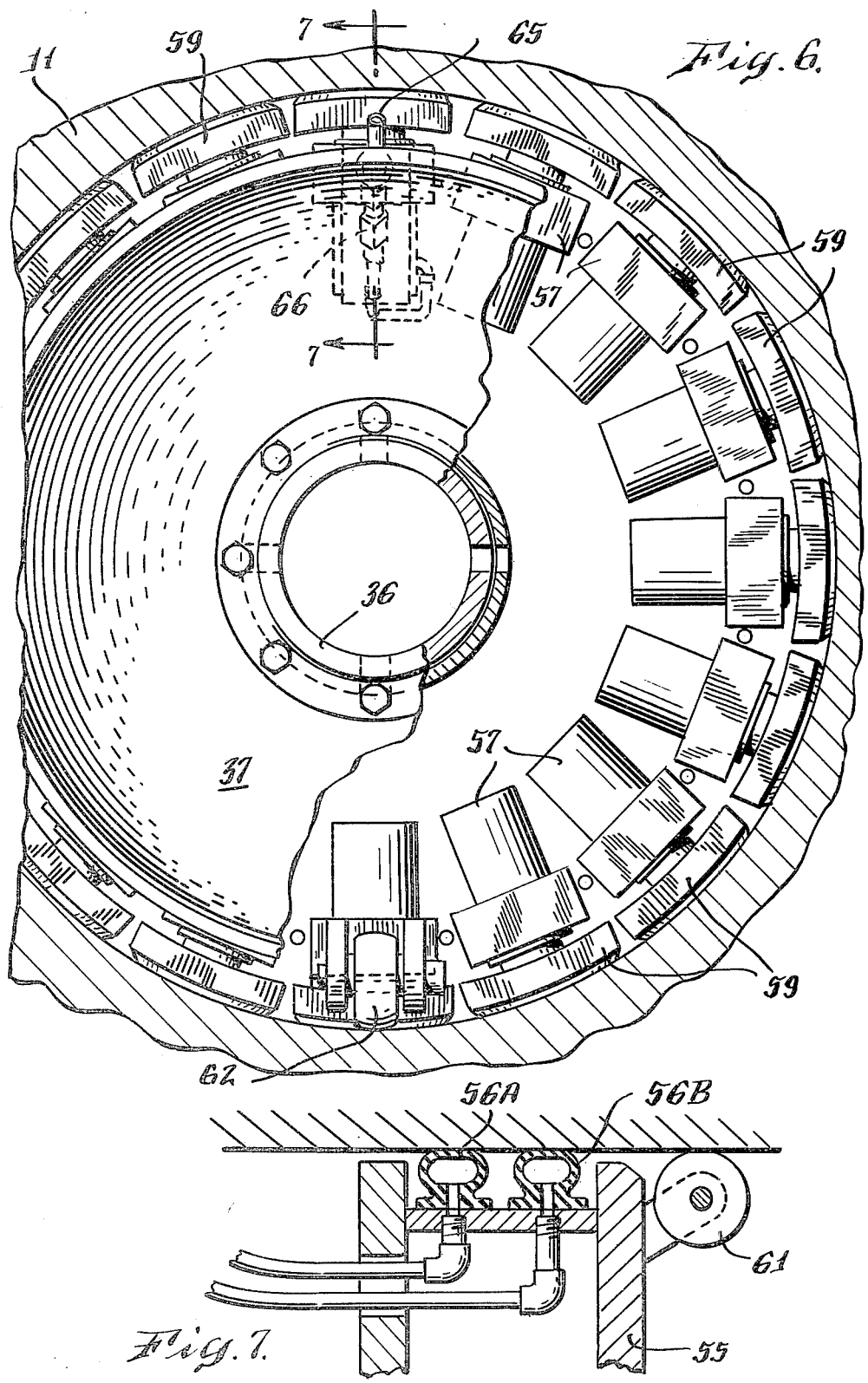

REMOVABLE PIPELINE PLUG

BACKGROUND OF THE INVENTION

Removable plugging devices have long been available in the plumbing and steamfitting arts for temporarily sealing pipelines to allow them to be drained for repair or pressure tested for leaks. In recent years a particular need for reliable pipeline plugs has arisen in nuclear power plants where pressure tests must periodically be carried out to assure that no leakage occurs in steamlines leading from the boiling water reactor. Such tests are typically conducted as completion of the refueling down time approaches and before reinstalling the reactor vessel head in order to reduce radiation exposure and outage, just prior to start-up of the plant. In the course of the tests, a removable plug is inserted in the main steam line to seal it off against pressure from either direction, which is to say from the reactor vessel to the pipeline or from the pipeline to the vessel.

In some prior art removable plugs, the locking action involves axially squeezing together opposed elements so as to increase the diameter of some expandable component between them. The component increasing in diameter engages the interior of a pipeline to hold the plug in place or create the seal or both. A rubber ring is axially compressed by wedged surfaces in accordance with this principle in U.S. Pat. No. 3,693,408. The axial forces which squeeze and expand a plug into the pipe in such prior art teachings may be generated by torquing a nut or by pressurizing a hydraulic cylinder or otherwise, and the component therebetween which expands in diameter may comprise metal shoes or be of resilient material. Inflatable annular seals are sometimes used alone as in U.S. Pat. No. 3,919,880, or in conjunction with expandable shoes as in U.S. Pat. No. 3,593,749.

In any case the plugs of the prior art have particular disadvantages which the present invention seeks to overcome. It is characteristic of all of the prior art squeeze-type plugs that given irregularities in pipeline dimensions it is practically impossible to determine accurately the radial locking force of the plug in the pipe and thus its true pressure retaining capability. Very few pipes are precisely round and when metal locking shoes are expanded radially in prior art plugs they move outwardly together to engage different areas of the pipeline interior with varying force, thereby generating concentrated loads which may severely stress the pipe wall. On the other hand creeping of the plug along the pipe sometimes occurs with a resulting pressure loss in the test section when rubber rings alone are relied upon to fix the plug in place and create the seal.

STATEMENT OF THE INVENTION

In accordance with the invention a removable pipeline plug assembly is provided which comprises a plug body and at least one inflatable annular member surrounding the body having a deflated diameter less than and an inflated diameter greater than the interior pipeline dimensions. At least one annular array of pistons extends radially from the body. Rigid shoes are radially translatable by the respective pistons between retracted positions adapted to clear the pipeline interior to extended positions therebeyond. Pivotal mounting means are provided permitting infinitely variable positioning of each shoe with respect to the body for self-adjusting engagement with even an out-of-round pipeline interior. Means are also included for inserting and withdrawing the plug from the pipeline with the inflatable member deflated and the shoes retracted. Means are included for actuating the pistons and extending the shoes into engagement with the pipeline interior to fix the plug within the pipeline. Pressurizing means are provided for inflating the inflatable member into resilient forcible annular sealing contact with the pipeline interior.

The invention also provides a method of selectively plugging a pipeline which comprises inserting a plug body within the pipeline, and fixing the body within the pipeline by radial extension therefrom of a plurality of rigid arcuate shoes into infinitely self-adjusting engagement with even an out-of-round pipeline interior. An annular member is then inflated outwardly from the body into resilient forcible annular sealing contact with the pipeline interior.

BRIEF DESCRIPTION OF THE DRAWINGS

FIG. 2 is an enlarged fragmentary elevation partly in section and broken away showing the plug of the invention within the steam pipeline and mounted on an installation tool;

FIG. 3 is an enlarged fragmentary elevation of the upper lifting end of the installation tool;

FIG. 4 is an enlarged fragmentary section taken along line 4—4 of FIG. 2 showing the connection between the installation tool and the removable plug;

FIG. 5 is an enlarged elevation partly in section of the plug within the pipeline;

FIG. 6 is a fragmentary section taken along the line 6—6 of FIG. 5;

FIG. 7 is an enlarged fragmentary section showing the inflatable seals and taken along the line 7—7 of FIG. 6;

FIG. 8 is an enlarged fragmentary section showing the pivotal mounting of one of the shoes on its piston.

DESCRIPTION OF PREFERRED EMBODIMENT

Figure 1:
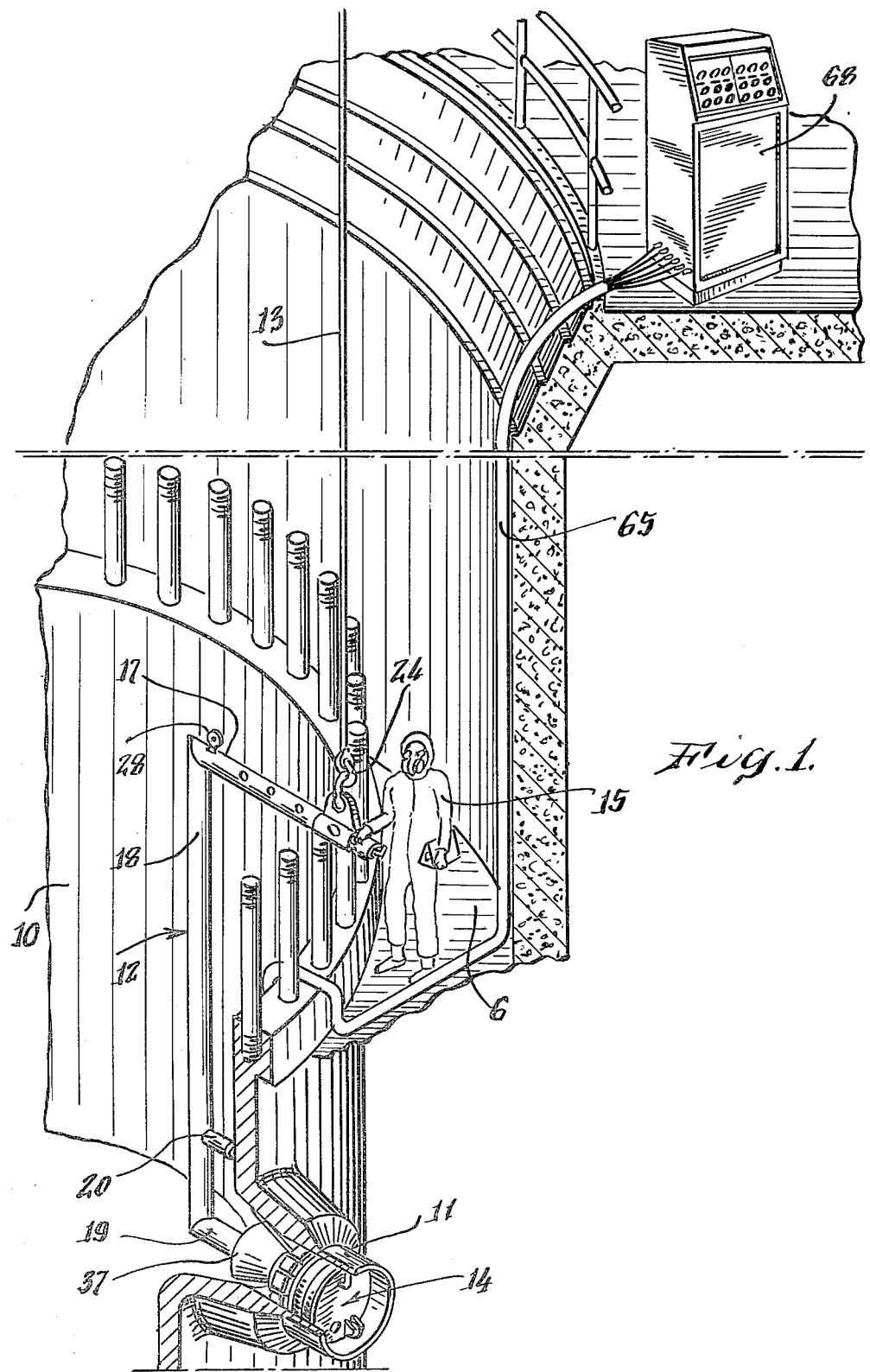
FIG. 1 is a fragmentary perspective view partly in section showing the upper portion of a boiling water reactor assembly with the removable pipeline plug assembly of the invention in a main steam outlet pipeline.

Referring first to FIG. 1 a boiling water reactor cavity 10 includes a steam outlet pipeline 11 which may typically be 21.5 inches in diameter. Two or three such steam outlets extend from the upper region of a reactor assembly and during an outage time it is necessary to seal off the opening of each in turn so as to subject the pipelines to a pressure test. Such a test is conducted by pumping either air or a liquid into the sealed off section of the pipeline 11 and observe whether or not leakage occurs; for illustration the system herein described is for testing with pressurized water.

In accordance with the invention an installation tool 12 is suspended from a support cable 13 hanging from an overhead crane to insert and later withdraw a removable plug 14 with respect to the mount of the pipeline 11. Referring to FIGS. 1 and 4 an operator 15 on a refueling seal platform 16 can reach and manipulate an upper horizontal arm 17 of the installation tool 12, the arm 17 extending from the platform area outwardly into the reactor cavity 10. A vertical arm 18 of the tool 12 extends downwardly to the level of the steam pipeline 11 where a lower horizontal arm 19 projects inwardly toward the plug 14 and pipeline 11 in a manner described below. A relatively short positioning arm 20 extends horizontally from the vertical arm 18 of the tool 12 to engage the inside of the reactor vessel to hold it in the proper vertical plane during operation.

Turning particularly to FIGS. 2 and 3 an adjustable lifting lug 22 has a lower collar portion 23 which telescopes over the end of the upper horizontal arm 17 of the tool 12. A hook 24 at the lower end of the support cable 13 engages a lifting eye on the lug 20 to suspend the tool 12 in its proper position. It will be understood that the tool 12 would hang plumb from the cable 13 in more than one position depending upon whether the lower horizontal arm 19 is weighted by the plug 14. If the lower end of the tool 12 is weighted with the plug 14 the lifting lug 22 must be attached closer to the outer end of the arm 17 so as to cause the tool 12 to hang plumb with its arm 18 vertical. For this reason, the lug 22 is slidable by its collar 23 along the arm 17 and can be fixed in six different positions by a pin 26 which fits through corresponding holes in the collar 23 and the arm 17. The pin 26 is shown in detail in one locked position in FIG. 3 and as with many of the parts of the apparatus it is connected to the collar 23 by chains 27 so that it cannot dislodge accidentally into the reactor assembly. Note that a secondary support eye 28 is located on the far end of the arm 17 remote from the lug 20. With the plug 14 removed from the tool 12 it is necessary if the tool is to be kept plumb to slide the collar 23 to the left as seen in FIG. 2 to a different setting of the pin 26.

A control handle 30 is within reach of the operator on the end of the arm 17 of the tool 12. A pull cable 31 extends from the control handle 30 around an appropriate pulley 32 and downwardly to another pulley 33 aligned with the lower horizontal arm 19. The pull cable 31 then extends horizontally to a latch-pin assembly at the end of the arm 19 shown in detail in FIG. 4.

The latch-pin assembly includes a cylinder 34 fixed to and projecting from the end of the lower horizontal arm 40 of the tool 12 and having a conical nose frame 35 at its outer end. The plug 14 into which the tool is to be inserted has an inner axial hub 36 of slightly larger inside diameter than the outside diameter of the cylinder 34. A flared guide 37 is attached to the inlet end of the hub 36 as seen particularly in FIG. 5 to receive the nose frame 35 of the tool and direct the cylinder 34 telescopically into the hub 36. Affixed within the cylinder 34 is a transverse body 38 which has an inner axial bore 39 in which a cylindrical cam 40 is axially slidable. A rod 41 projects from the forward end of the cam 40 and has adjustment nuts 42 at its outer end against which a disc stop 43 is urged by a compression spring 44. The spring 44 urges the cam 40 to the right as shown in FIG. 4 so that a larger cam diameter 45 is within the transverse plane of four radial holes 46 in the body 38. The cam also has a tapered surface 48 which is within the transverse plane of the holes 46 when the cam 40 is moved to the left as seen in FIG. 4 against the force of the spring 44. The operator 15 accomplishes such movement by pulling on the control handle 30 and thus causing the pull cable 31 to displace the cam 40. As an alternate emergency cam displacement means, a secondary release handle 49 is affixed to the cam 40 and extends out of the lower horizontal arm 19 of the tool 12.

Four latch pins 50 are radially mounted in the body 38 with follower ends 51 extending through the respective holes 46 into engagement with the cam 40. Compression springs 52 are located within the body 38 as shown to urge the latch pins 50 radially inwardly toward their retracted positions, which is prevented by the larger surface 45 of the cam 40 when the cam is in the position shown in FIG. 4. It will be seen that by displacement of the cam 40 to the left with a pull on the cable 31 against the spring 44, the followers 51 ride down the tapered surface 48 of the cam to allow the four latch pins 50 to retract radially inwardly under the force of their springs 52. When such retraction occurs the latch pins 50 withdraw from corresponding holes 53 in the hub 36 of the plug 14 and allow the tool 12 to be released from the plug 14.

From the foregoing it will be apparent that the plug 14 is releasably held on the end of the tool 12 by the latch-pin assembly while the plug is manipulated into place in the mouth of the steam line 11. The operator then pulls the control handle 30 to release the latch pins 50 and the tool 12 is moved away with the plug 14 left in the steam line 11. The process is reversed after the plug serves its purpose in a pressure test. The latch-pin assembly is guided into place while the operator holds the control handle 30 in its pulled back position. On release of the handle 30 as the cylinder 34 reaches the position in the hub 36 shown in FIG. 4 the latch pins 50 spring into their desired locked positions.

Turning now to FIGS. 5 to 7 the plug 14 includes a stainless steel cylindrical welded body 55 on the hub 36 surrounded at its forward end by a pair of inflatable seals 56A and 56B of EPDM rubber (ethylene propylene diene monomer). Each seal has a deflated diameter less than and an inflated diameter greater than the interior dimensions of the pipeline 11. The body also supports sixteen hydraulic cylinders and pistons 57 which provide the radial locking force required to withstand the desired pressure from either side of the plug. The cylinders 57 are in fact divided into two entirely separate redundant circuits with eight cylinders 57A of one circuit alternating around the plug with eight cylinders 57B of the other circuit, all of the cylinders being disposed in the same transverse plane. The piston rod 58 of each cylinder pivotally supports a shoe 59 having a knurled gripping surface and spring biased into retracted position. As shown in FIG. 8, the connection between an end element 60 of each piston rod 58 and its associated shoe 59 is that of a loose universal ball and socket so that the shoe 59 can assume infinitely variable positions. The shoes are therefore self-adjusting to lie substantially flush with even out-of-round pipeline interiors. Each shoe is slightly arcuate in shape as shown in FIG. 6 to conform as closely as possible in curvature to the steam line 11. The total force of the shoes 59 on the inside of the pipeline 11 can be accurately predetermined regardless whether the pipeline is somwhat out-of-round because it is a direct function of the hydraulic pressure within the cylinders 57.

There are three guide rollers 61 extending from the forward end of the plug 14 to allow it to roll to its proper place and there is one guide roller 62 at the rear of the plug to support its weight. An air vent 63 extends through the forward end of the body 55 of the plug as does a main steam line water-fill pressurization port 64. A plurality of hydraulic and pneumatic pressure lines 65 extend downwardly to the plug and are attached by respective quick-connect fittings 66. The hydraulic and pneumatic lines 65 and 66 extend upwardly to a control cabinet 68 located on the refueling floor of the reactor assembly.

Figure 9:
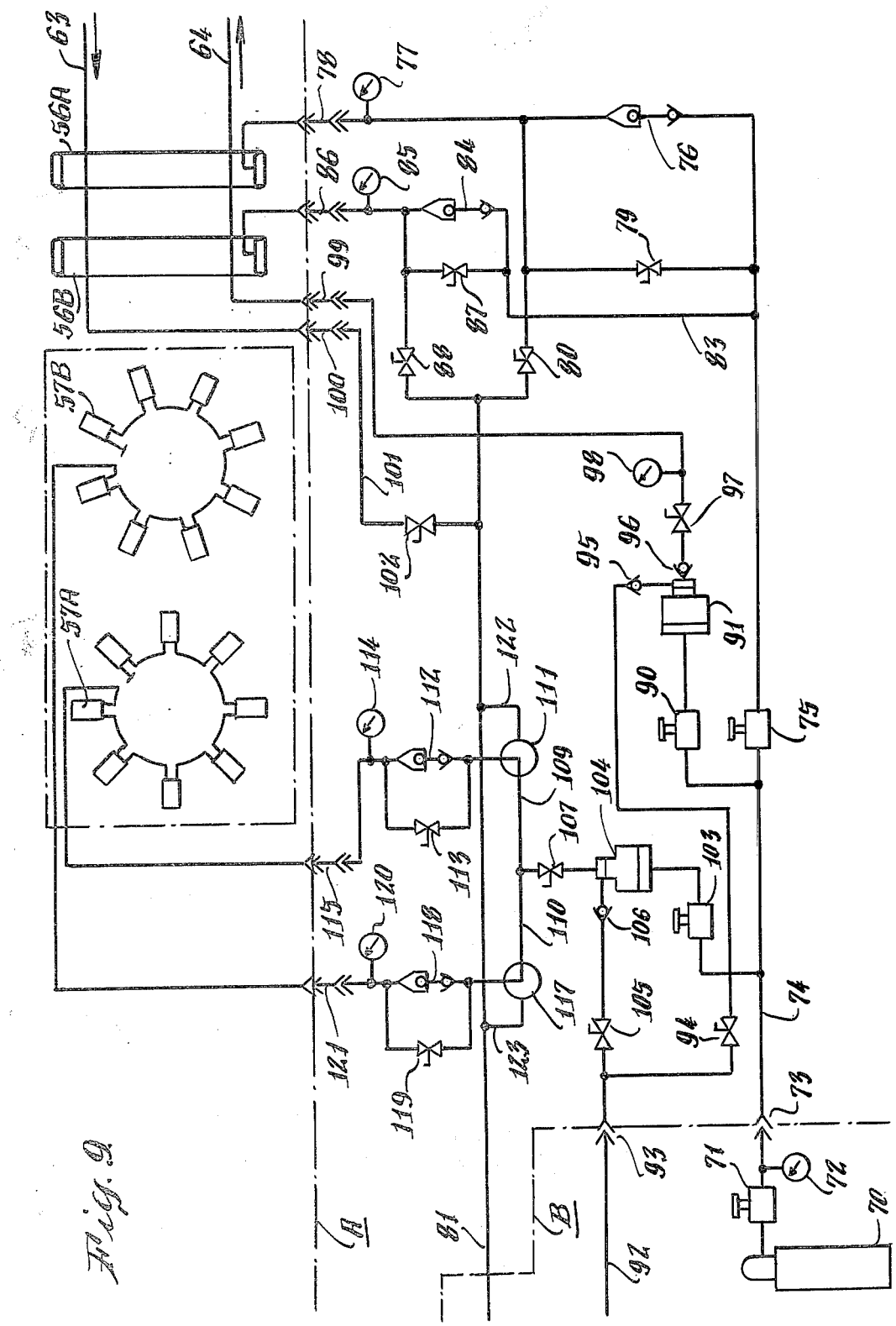
FIG. 9 is a schematic diagram of the hydraulic and pneumatic systems associated with the invention.

A typical control system and circuit for operating the plug 14 during a pressure test is shown schematically in FIG. 9. For purposes of better understanding the circuit diagram of FIG. 9 it is to be understood that all components above the dot-dash line A are part of the plug 14, all components grouped in the lower left corner of the figure within the dot-dash line B are located upstream of or beyond the control cabinet 68, and all remaining components and lines between the dot-dash lines A and B are located in the control cabinet 68 or extending toward the plug 14. Standard shop compressed air at 100 psi, preferably backed up by a gas bottle 70, delivers air through a pressure regulator 71 at a consistent 100 psi level monitored by a pressure gauge 72. A quick-connect fitting 73 carries that air to a line 74 in the control cabinet 68. A pressure regulator 75 in the line 74 reduces the pressure to 45 psi maximum which, through a check valve 76 and a pressure gauge 77, is directed through a quick-connect fitting 78 to the plug 14 and the inflatable seal 56A. A shutoff valve 79 can be used to dump the air in the event of failure of the check valve 76. During deflation of the inflatable seal 56A a shutoff valve 80 is opened to allow escape through a line 81 to the pool of the reactor.

A totally separate system is provided for the inflatable seal 56B. It consists of a line 83 carrying the 45 psi air through a check valve 84 and pressure gauge 85 and through a quick-connect fitting 86 to the seal 56B. This system has its own bypass valve 87 for dumping of air and shutoff valve 88 for deflation through the line 81.

For purposes of conducting a hydraulic pressure test in the main steam line 11 ahead of the plug 14, pressure regulator 90 operates a pressure intensifier 91. Demineralized water is carried through a line 92, through a quick-connect fitting 93 and a shutoff valve 94 and check valve 95, to a test pressure of 35 psi by means of the pressure intensifier 91. This pressurized water passes through another check valve 96, a shutoff valve 97 and a hydraulic pressure gauge 98, through a quick-connect fitting 99 into the plug 14 where it exits forwardly through the main steam line water pressurization port 64. As the steam line 11 is filled with water during the test, the ullage air is evacuated through the vent 63, a quick-connect fitting 100 and a line 101 and thence through an appropriate shutoff valve 102 to the pool of the reactor through the line 81.

The hydraulic circuits for the cylinders 57A and 57B begin with a pressure regulator 103 off the 100 psi pneumatic line 74 which operates a pressure intensifier 104 receiving demineralized water from the line 92 through a shutoff valve 105 and check valve 106. Water at high pressure leaves the pressure intensifier 104 through a shutoff valve 107 and forks into two separate redundant hydraulic lines 109 and 110. The line 109 passes through a three-way control valve 111 which can direct the liquid through a check valve 112, bypassed with a normally closed shutoff valve 113, and pressure gauge 114 through a quick-connect fitting 115 to the array of eight cylinders 57A in the plug 14. Similarly, a hydraulic line 110 carries the liquid through a three-way control valve 117 and a check valve 118, bypassed with a normally closed shutoff valve 119, then to a hydraulic pressure gauge 120 and through a quick-connect fitting 121 to the second array of eight hydraulic cylinders 57B. By changing the position of the three-way control valves 111 and 117 the liquid in the cylinders 57A and 57B can be evacuated through lines 122 and 123 respectively to the line 81 venting to the pool of the reactor.

This hydraulic and pneumatic circuitry is described only for purposes of illustration because it will be apparent that variations can be made depending upon the desired testing sequence. For example, the pressurization port 64 can be connected to the air supply rather than the hydraulic supply if a pneumatic pressure test is desired on the steam line 11 and in that case the circuitry would be quite different.

The operation of the circuitry and apparatus described heretofore should be apparent but it is appropriate to describe in a general sense the method of carrying out a test with the plug 14 of the invention. The plug 14 is inserted on the end of the installation tool 12 and, with the lug 20 located by an appropriate setting of the pin 26, the cable 13 is used to swing the equipment into the reactor cavity with all appropriate hoses 65 connecting the plug 14 to the control cabinet 68. When the plug 14 is in proper position, the control handle 30 is pulled outwardly to disengage the latch pins 50 and the tool 12 is swung away leaving the plug 14 in place in the steam line 11. The shoes 59 supported by the cylinders 57A and 57B are normally in spring-biased retracted position until the valves are operated on the control cabinet 68 to activate the cylinders 57A and 57B. This brings their respective shoes into tight corresponding engagement with the inside of the steam line 11 and even if the surface of the steam line is somewhat out-of-round the shoes nonetheless self-adjust into forcible substantially flush engagement because of the universal nature of their pivotal mounting. The force of the shoes on the inside of the steam line is such that either set of shoes 57A or 57B could hold the plug in place against test pressure.

By appropriate operation of the valves on the control cabinet 68 the two inflatable seals 56A and 56B are inflated to come into resilient contact with the inside of the steam line 11 as shown in FIG. 7. Like the cylinders the two inflatable seals are independent of one another and each is capable of maintaining the seal during a test. A typical hydraulic test involves injecting the pressurized liquid through a port 64 and thus allowing ullage air to evacuate through the vent 63 and ultimately through the line 81 to the reactor pool. After the test the pressurizing liquid is also dumped through the line 81 back to the pool by operation of the controls as shown in FIG. 9.

It is characteristic of the apparatus and method of the invention that a universally adjustable metal-to-metal grip is maintained by the plug on the steam line while separate inflatable seals are established. The scope of the invention is set forth not in the foregoing description of a preferred embodiment but in the following claims.

We claim:
1. In combination with a steam pipeline of a boiling water reactor, a removable pipeline plug assembly comprising:
   (a) a plug body,
   (b) two redundant annular members surrounding said body each having a deflated diameter less than and an inflated diameter greater than the interior pipeline dimensions,
   (c) two redundant annular arrays of hydraulic pistons extending radially from said body and alternating in the same plane,
   (d) rigid arcuate metal shoes radially and independently translatable by the respective pistons be- tween retracted positions adapted to clear the pipeline interior and extended positions therebeyond, (e) pivotal mounting means permitting infinitely variable positioning of each shoe on its piston for self-adjusting substantially flush engagement with even out-of-round pipeline interiors, (f) a detachable tool for inserting and withdrawing the plug from a selected variable position within the pipeline with the inflatable member deflated and the shoes retracted, (g) hydraulic means for actuating the pistons and extending the shoes into engagement of substantially predetermined force with the pipeline interior to fix the plug within the pipeline, (h) pneumatic pressurizing means for inflating the inflatable member of the inserted plug into resilient forcible annular sealing contact with the pipeline interior, and (i) valved conduit means for introducing a pressurized test fluid through and forward of the plug body and for venting fluids back through the plug body.

* * * * *